United States Patent
Hwang et al.

(10) Patent No.: US 8,880,918 B2
(45) Date of Patent: Nov. 4, 2014

(54) METHOD AND APPARATUS FOR COMMUNICATION BETWEEN SERVER AND CUSTOMER PREMISE EQUIPMENT OVER INTERNET-BASED NETWORK

(75) Inventors: Doo-Il Hwang, Seoul (KR); Hyon-Seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 12/966,123

(22) Filed: Dec. 13, 2010

(65) Prior Publication Data
US 2011/0145608 A1    Jun. 16, 2011

(30) Foreign Application Priority Data

Dec. 15, 2009    (KR) .................. 10-2009-0124738
Dec. 15, 2009    (KR) .................. 10-2009-0124864

(51) Int. Cl.
| | |
|---|---|
| *G06F 1/00* | (2006.01) |
| *G06F 1/32* | (2006.01) |
| *H04L 12/24* | (2006.01) |
| *H04L 29/08* | (2006.01) |
| *H04L 12/28* | (2006.01) |
| *H04L 12/12* | (2006.01) |

(52) U.S. Cl.
CPC ............ *H04L 12/12* (2013.01); *H04L 41/0816* (2013.01); *H04L 41/0833* (2013.01); *H04L 67/34* (2013.01); *H04L 12/2898* (2013.01); *H04L 41/0213* (2013.01); *Y02B 60/34* (2013.01); *H04L 67/125* (2013.01)

USPC ............ 713/310; 713/300; 713/320; 713/323; 725/111; 725/132; 725/140; 725/152

(58) Field of Classification Search
USPC .......... 713/300, 310, 320, 323; 725/111, 132, 725/140, 152
See application file for complete search history.

(56) References Cited

U.S. PATENT DOCUMENTS

| | | | |
|---|---|---|---|
| 7,587,746 B1 | 9/2009 | Schwartzman et al. | |
| 2005/0135269 A1* | 6/2005 | Saint-Hilaire et al. | ........ 370/254 |
| 2008/0076403 A1* | 3/2008 | Park et al. | ........... 455/422.1 |

FOREIGN PATENT DOCUMENTS

WO    2006/035404 A1    4/2006

OTHER PUBLICATIONS

XP 017829644, DVB Organization: CM-SEC1118 DSLF-TR-069. PDF.

* cited by examiner

*Primary Examiner* — Michael J Brown
(74) *Attorney, Agent, or Firm* — Jefferson IP Law, LLP

(57) ABSTRACT

A method and an apparatus for communication between an Automatic Configuration Server (ACS) and a Customer Premise Equipment (CPE) over an Internet-based network are provided. A CPE determines in a power standby state whether an inform request message transmission period is received. If the inform request message transmission period is received, the CPE transitions from the power standby state to an active state and transmits an inform request message to an ACS. The CPE receives an inform response message from the ACS in response to the inform request message, and upon receiving the inform response message, transitions from the active state to the power standby state.

23 Claims, 10 Drawing Sheets

Inform Request Message

| | |
|---|---|
| DeviceID | ~ 802 |
| Event | ~ 804 |
| MaxEnvelopes | ~ 806 |
| CurrentTime | ~ 808 |
| RetryCount | ~ 810 |
| ParameterList | ~ 812 |
| StateInfo | ~ 814 |

FIG.8

METHOD AND APPARATUS FOR COMMUNICATION BETWEEN SERVER AND CUSTOMER PREMISE EQUIPMENT OVER INTERNET-BASED NETWORK

PRIORITY

This application claims the benefit under 35 U.S.C. §119 (a) of a Korean patent application filed in the Korean Intellectual Property Office on Dec. 15, 2009 and assigned Serial No. 10-2009-0124864, and a Korean patent application filed in the Korean Intellectual Property Office on Dec. 15, 2009 and assigned Serial No. 10-2009-0124738, the entire disclosure of both of which is hereby incorporated by reference.

BACKGROUND OF THE INVENTION

1. Field of the Invention

The present invention relates to a communication method and apparatus. More particularly, the present invention relates to a method and an apparatus for communication between a server and a Customer Premise Equipment (CPE) over an Internet-based network.

2. Description of the Related Art

Due to the development of communication technologies, there is a growing interest in technologies for connecting home information appliances to a network. Accordingly, many technologies have been developed to connect home information appliances to an external device, such as a server of a mobile service operator network, over an Internet Protocol (IP) network, and to manage the information appliances. Information security technology should be employed to securely and reliably provide such network technologies, and technology for an interface between different devices should be standardized to realize reliable/compatible/interactive networks.

Organizations for standardization of such technologies include a Digital Subscriber Line (DSL) forum, an International Telecommunication Union Telecommunication Standardization Sector (ITU-T), and a Digital Living Network Alliance (DLNA) forum. Among them, the DSL forum is the leading organization and has proposed TR-069 as a standardized protocol.

TR-069, a technology recently getting worldwide attention, realizes a method of comprehensively controlling and managing Customer Premise Equipments (CPEs) existing in the home, such as a DSL modem, an Internet gateway device, and a Set-Top Box (STB), over an Automatic Configuration Server (ACS) or a remote control server.

Conventionally, a Simple Network Management Protocol (SNMP) has been widely used to control CPEs by means of an external remote device. However, as it is not standardized, a Management Information Base (MIB) data configuration is different for every service provider, and its security is somewhat vulnerable. Accordingly, technology transitions are being made to the TR-069 technology and, therefore, many service providers require the TR-069 technology.

Therefore, a need exists for a method and an apparatus for exchanging inform messages by a CPE in a power standby state.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for communication between a server and a Customer Premise Equipment (CPE) over the Internet.

Another aspect of the present invention is to provide a method and an apparatus for exchanging inform messages in a CPE.

Still another aspect of the present invention is to provide a method and an apparatus for exchanging inform messages by a CPE in a power standby state.

Yet another aspect of the present invention is to provide a method and an apparatus for upgrading a CPE.

Still another aspect of the present invention is to provide a method and an apparatus for upgrading a CPE in its power standby state.

In accordance with an aspect of the present invention, a communication method in a CPE is provided. The communication method includes determining, in a power standby state, whether an inform request message transmission period has been received, if the inform request message transmission period has been received, transitioning from the power standby state to an active state and transmitting an inform request message to an Automatic Configuration Server (ACS), receiving an inform response message from the ACS in response to the inform request message, and upon receiving the inform response message, transitioning from the active state to the power standby state.

In accordance with another aspect of the present invention, a communication apparatus for performing communication with an ACS is provided. The communication apparatus includes a front panel for determining, in a power standby state, whether an inform request message transmission period has been received, and for generating a wake-up signal if the inform request message transmission period has been received, and a communication controller for transitioning from the power standby state to an active state if the wake-up signal is generated by the front panel, for transmitting an inform request message to the ACS, receiving an inform response message from the ACS in response to the inform request message, and for switching the communication apparatus from the active state to the power standby state upon receiving the inform response message.

In accordance with a further aspect of the present invention, a communication method in an ACS performing communication with a CPE is provided. The communication method includes receiving an inform request message from the CPE, transmitting an inform response message to the CPE in response to the inform request message, determining state information of the CPE, included in the inform request message, transmitting no download message to the CPE if the state information represents an active state, and transmitting a download message to the CPE if the state information represents a power standby state.

In accordance with a further aspect of the present invention, an ACS apparatus is provided. The ACS apparatus includes a message receiver for receiving an inform request message from a CPE, a controller for determining state information of the CPE, included in the received inform request message, and for instructing the ACS to transmit a download message when the state information represents a power standby state, and a message transmitter for transmitting the download message and an inform response message, in response to the inform request message, to the CPE under control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8 is a diagram illustrating a format of an inform request message with state information according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1:
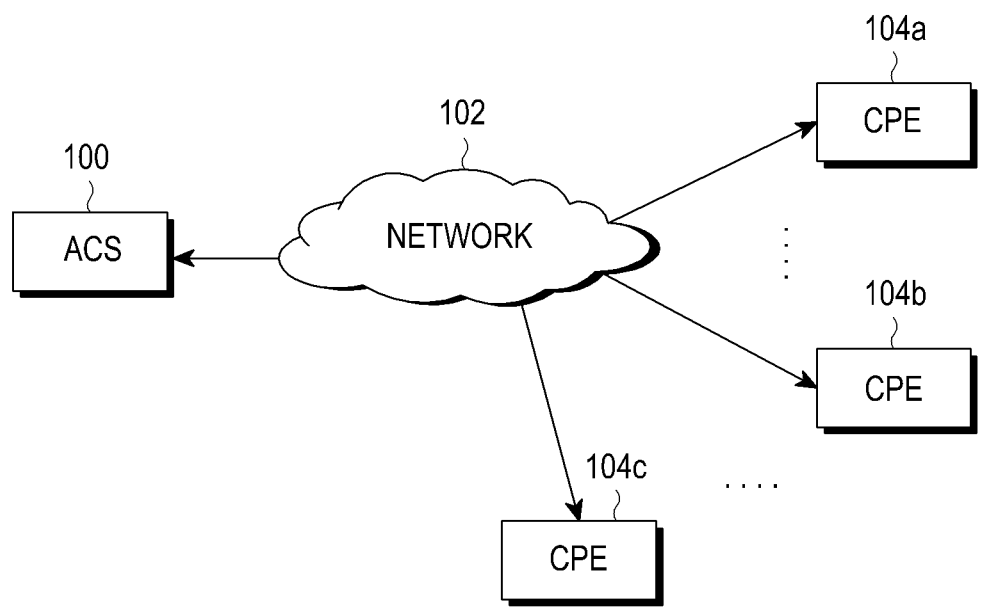
FIG. 1 is a diagram illustrating a configuration of a network between Customer Premise Equipments (CPEs) based on TR-069 technology and an Automatic Configuration Server (ACS) for managing the CPEs according to an exemplary embodiment of the present invention.

FIG. 1 is a diagram illustrating a configuration of a network between Customer Premise Equipments (CPEs) based on TR-069 technology and an Automatic Configuration Server (ACS) for managing the CPEs according to an exemplary embodiment of the present invention.

Referring to FIG. 1, an ACS 100 manages CPEs 104a, 104b and 104c over an Internet Protocol (IP) network 102 in accordance with the TR-069 standard. As defined in the TR-069 standard, the ACS 100 exchanges inform request/response messages with the CPEs 104a, 104b and 104c to periodically query and control information about the CPEs 104a, 104b and 104c. The inform request/response messages defined in TR-069 are one of the important messages that the ACS 100 and the CPEs 104a, 104b and 104c should necessarily exchange to perform communication. One or more of the CPEs 104a, 104b and 104c shown in FIG. 1 may be installed in every home.

When starting communication, the ACS 100 and the CPEs 104a, 104b and 104c must exchange inform messages. The inform message exchange denotes a process in which the ACS 100 and the CPEs 104a, 104b and 104c exchange an inform request message and an inform response message. After successfully exchanging inform messages with the CPEs 104a, 104b and 104c, the ACS 100 may exchange a set of messages to perform desired functions, such as providing information for software (S/W) upgrade (e.g., upgrade start notification), a CPE information request, and an appropriate solution for a CPE in trouble. Meanwhile, an inform request message transmission period is remotely set for each CPE by the ACS 100, and each CPE stores and manages the set value in its memory.

The CPEs 104a, 104b and 104c, such as Set-Top Boxes (STBs), are located in a fixed position in the home and should be installed to be always supplied with power. However, since the continuous power supply leads to a waste of power, the CPEs 104a, 104b and 104c are set to transition to a power standby state when unused, so as to reduce the unnecessary power waste. Disadvantageously, however, the inform request/response messages may not be transmitted if the CPEs 104a, 104b and 104c are powered off, or in a power standby state.

Since service providers want to query CPEs in real time, they transmit a request for exchange of inform request/response messages to the CPEs at least once a day. If the CPEs 104a, 104b and 104c are always powered on for the message exchange, power consumption may increase undesirably.

A CPE, according to exemplary embodiments of the present invention, is premise equipment installed in the home, and refers to the equipment that can access the IP network and provide services to users, such as an STB and a Digital Subscriber Line (DSL) modem.

A method and an apparatus for performing communication between a CPE and an ACS over the Internet will be described below. More particularly, descriptions will be made of a method and an apparatus in which TR-069 protocol-based inform messages can be transmitted regardless of the state of a CPE, using a power standby state of the CPE, and a method and an apparatus capable of upgrading a CPE.

Figure 2:
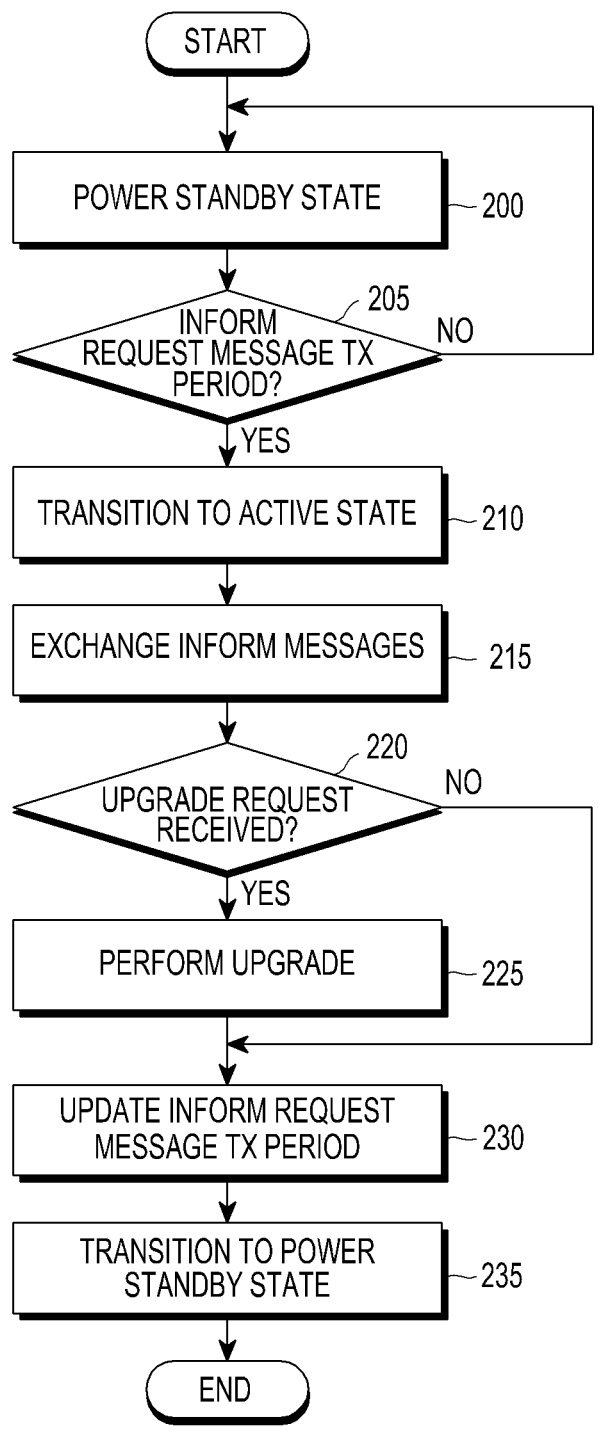
FIG. 2 is a flowchart illustrating an operation of a CPE communicating with an ACS according to an exemplary embodiment of the present invention.

FIG. 2 is a flowchart illustrating an operation of a CPE communicating with an ACS according to an exemplary embodiment of the present invention.

Referring to FIG. 2, a CPE, which is in a power standby state in step 200, determines in step 205 whether a transmission period of an inform request message has been received. If it is determined in step 205 that a transmission period of an inform request message has been received, the CPE transitions to an active state in step 210, and exchanges inform messages with an ACS in step 215. The inform message exchange includes transmitting an inform request message to the ACS by the CPE, and receiving an inform response message from the ACS by the CPE.

In step 220, the CPE determines whether an S/W upgrade request has been received from the ACS. If it is determined in step 220 that an S/W upgrade request has been received from the ACS, the CPE performs S/W upgrade in step 225. The S/W upgrade is performed by receiving the latest version of software from the ACS by the CPE. The CPE updates the inform request message transmission period in step 230, and then transitions to the power standby state in step 235.

Figure 3:
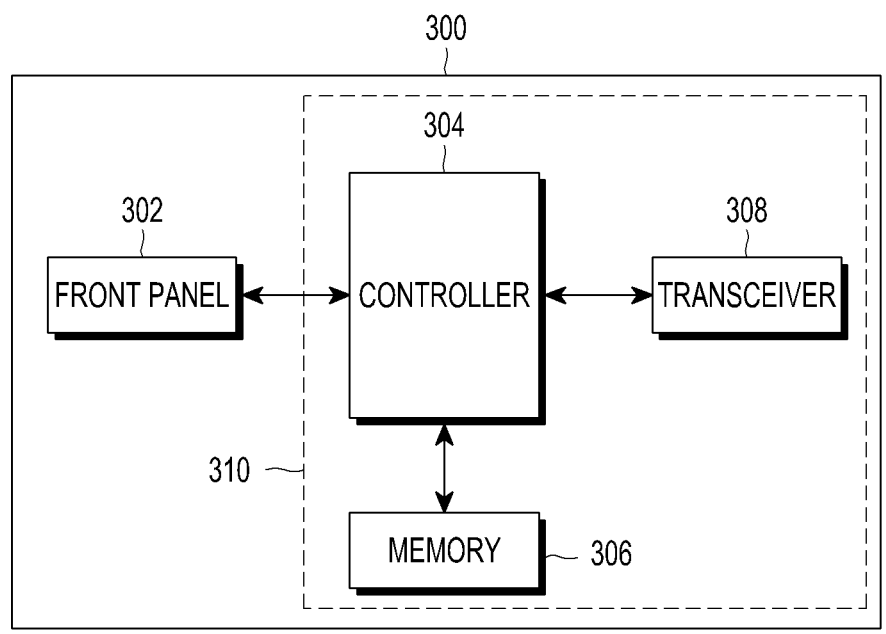
FIG. 3 is a block diagram of a CPE for communicating with an ACS over the Internet according to an exemplary embodiment of the present invention.

FIG. 3 is a block diagram of a CPE for communicating with an ACS over the Internet according to an exemplary embodiment of the present invention.

Referring to FIG. 3, a CPE 300 includes a controller 304, a memory 306, and a transceiver 308 are referred to as a communication controller 310, since they perform the overall operation associated with inform message and S/W upgrade processing by communicating with an ACS according to an exemplary embodiment of the present invention.

In exemplary embodiments of the present invention, an operating state of the CPE 300 is distinguished into an active state and a power standby state. The active state denotes a normal state in which the CPE 300 exchanges messages with the ACS 100 and provides services to users. The power standby state denotes a sleep state or a power saving state for preventing power dissipation, wherein the CPE 300 stops power supply to other blocks except for a front panel 302, and supplies the minimum power evenly to the controller 304. That is, in the power standby state, operating power is supplied only to the front panel 302.

Though not shown, the front panel 302 visually displays the current time on a display for a user, and delivers a control signal input by the user through a remote controller, to the controller 304. In accordance with an exemplary embodiment of the present invention, the front panel 302 counts an inform request message transmission period acquired by the controller 304, and if the inform request message transmission period is counted, transmits the controller 304 a specific signal for informing the necessity of exchanging inform messages. That is, upon counting the inform request message transmission period, the front panel 302 informs the controller 304 of the time at which an inform request message is to be transmitted, and the controller 304 transmits an inform request message to the ACS 100 via the transceiver 308 at the informed time thereby to exchange inform messages with the ACS 100.

If the CPE 300 is in an active state, the controller 304 may transmit an inform request message to the ACS 100 every time the front panel 302 counts an inform request message transmission period. In contrast, if the front panel 302 completes the counting of an inform request message transmission period while the CPE 300 is in a power standby state, the front panel 302 informs the controller 204 of the advent of an inform request message transmission period by transmitting a wake-up signal. Upon receiving the wake-up signal, the controller 304 transitions the CPE 300 to an active state to transmit an inform request message.

The front panel 302 may deliver, to the controller 304, a control signal that is input from a user's remote controller via an infrared interface (not shown).

The controller 304, controlling the overall operation of the CPE 300, receives a request from the ACS 100 by remote invocation, through the transceiver 308, which performs a process appropriate for the request, and then transmits the processing results back to the ACS 100 via the transceiver 308. In accordance with an exemplary embodiment of the present invention, the controller 304 performs inform message exchange by exchanging inform request/response messages with the ACS 100 through the transceiver 308, and stores, in the memory 306, various request information or control information included in an inform response message received from the ACS 100. The transceiver 308 exchanges inform request/response messages with the ACS 100 using a Hyper Text Transfer Protocol (HTTP) or a Hyper Text Transfer Protocol over Secure (HTTPS), which is a security-enhanced HTTP.

If a preset inform request message transmission period has been received, the controller 304 transmits an inform request message with state information of the CPE 300 to the ACS 100 through the transceiver 308. For example, if the CPE 300 is in a power standby state in the preset inform request message transmission period, the controller 304 transmits an inform request message with state information indicating the power standby state, to the ACS 100. In contrast, if the CPE 300 is in an active state in the preset inform request message transmission period, the controller 304 transmits an inform request message with state information indicating the active state, to the ACS 100. In addition, the inform request message includes version information of the software installed in the CPE 300.

Upon receiving a download message from the ACS 100 in response to the inform request message, the controller 304 performs an S/W upgrade procedure predefined by a manufacturer of the CPE 300. The download message is transmitted from the ACS 100 in response to an inform request message including state information representing a power standby state. For example, upon receiving the download message from the ACS 100, the controller 304 performs S/W upgrade by receiving (downloading) the latest version of software from the ACS 100, and then storing the received latest version of software in the memory 306. After the exchange of inform messages with the ACS 100 and the S/W upgrade are completed, the controller 304 stores, in the memory 306, an inform request message transmission period set by the ACS 100 and the current state information of the CPE 300. The controller 304 repeatedly performs the operation in which the controller 304 transmits an inform request message generated at the advent of the stored inform request message transmission period, to the ACS 100 through the transceiver 308. After the inform message exchange, the controller 304 may acquire a value of the inform request message transmission period that the ACS 100 transmitted using the HTTP or HTTPS. For example, the ACS 100 may notify the inform request message transmission period using a SetParameterValue. Realized with a flash memory, the memory 306 may preserve stored information despite interrupt of power supply to the CPE 300.

Figure 4A:
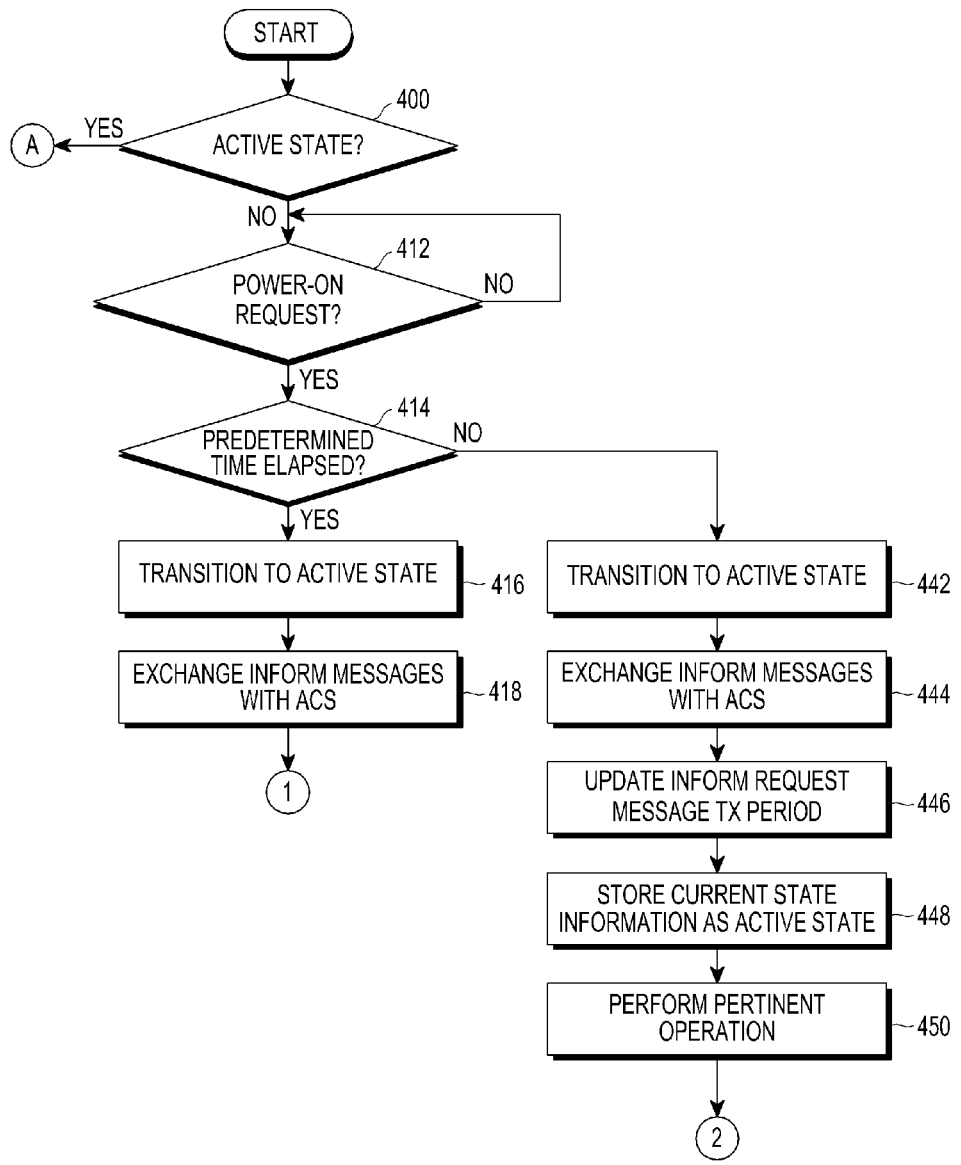
FIGS. 4A through 4C are flowcharts illustrating a communication method in a CPE according to an exemplary embodiment of the present invention.
Figure 4B:
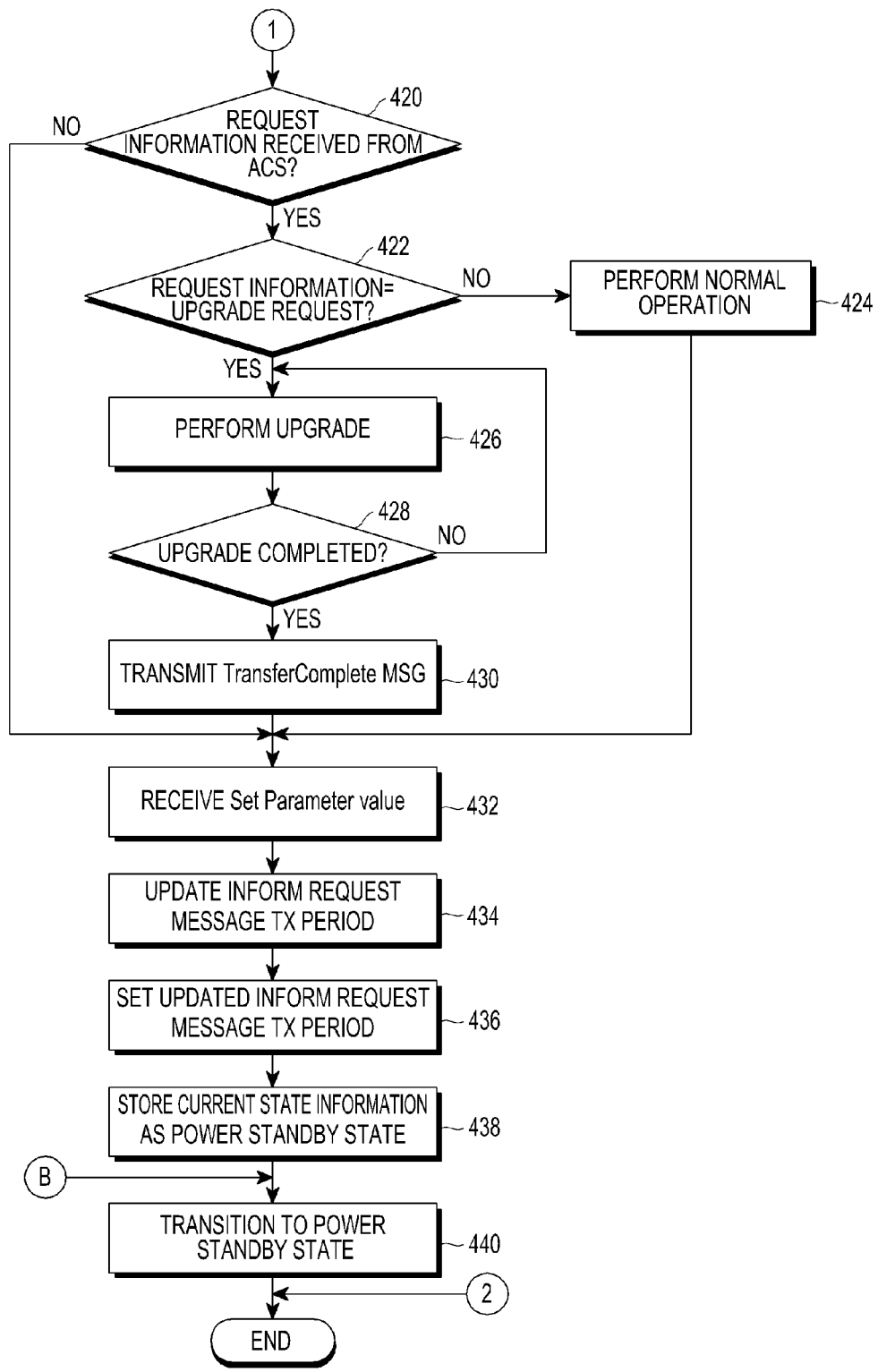
Figure 4C:
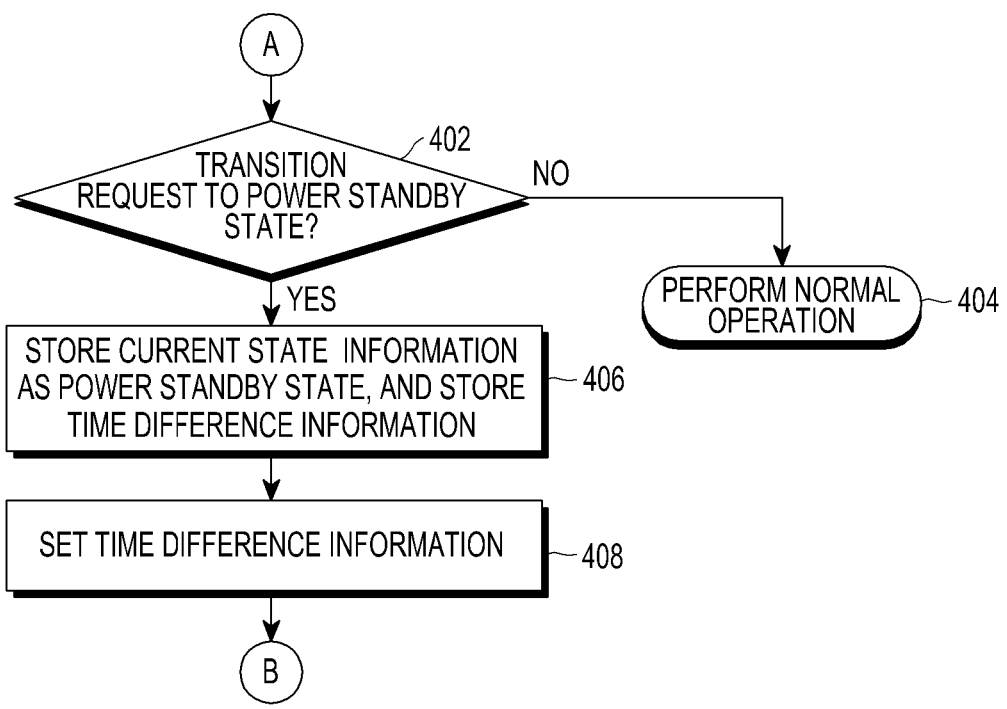

FIGS. 4A through 4C are flowcharts illustrating a communication method in a CPE according to an exemplary embodiment of the present invention.

Referring to FIGS. 4A through 4C, a CPE 300 determines in step 400 if it is in an active state. If it is determined in step 400 that the CPE 300 is in an active state, the CPE 300 determines in step 402 whether it has received a request to transition to a power standby state, from a user. If it is determined in step 402 that the CPE 300 has not received a request to transition to a power standby state, from a user, the CPE 300 performs a normal operation in step 404. On the other hand, the transition request to a power standby state in step 402 may be made by manipulating (pushing) a specific button on a remote controller by the user. If the user makes a request to transition to a power standby state using a remote controller, the front panel 302 receives a transition request signal to a power standby state, transmitted from the remote controller, and transmits the received signal to the controller 304. Then the controller 304 may determine that the user has requested to make the CPE 300 transition to a power standby state.

The normal operation in step 404 may include a user-desired service, e.g., a broadcast service provided over the IP network if the CPE 300 is an STB. On the other hand, upon receiving the transition request to a power standby state from the user in step 402, the CPE 300 sets and stores its current state information as a power standby state, and stores time difference information representing a difference between the current time and a time at which the next inform request message is to be transmitted according to the inform request message transmission period, in step 406. The CPE 300 sets the time difference information in step 408, and then transitions to a power standby state in step 440.

Since an inform request message is transmitted in every inform request message transmission period set by the ACS 100, the time difference information may be time difference information from the current time until the time at which the next inform request message is to be transmitted, according to the inform request message transmission period.

A process of setting time difference information by the CPE 300 in step 408 is described below. The controller 304 in the CPE 300 delivers the time difference information to the front panel 302 before transitioning from an active state to a power standby state, and the front panel 302 counts a time set in the time difference information delivered by the controller 304. The front panel 302 may count the set time by up-counting from '0' to the set time, or down-counting from the set time to '0'.

In contrast, if it is determined in step 400 that the CPE 300 is not in an active state, the CPE 300 determines in step 412 whether it has received a power-on request. In step 412, the controller 304 may determine whether the CPE 300 has received a power-on request in a power standby state, depending on whether it has received a wake-up signal that the front panel 302 transmits upon counting an inform request message transmission period. If it is determined in step 412 that the CPE 300 has received a power-on request, the CPE 300 determines in step 414 whether a predefined time has elapsed. The predefined time refers to time difference information set in the previous active state, and represents a time at which the next inform request message should be transmitted according to an inform request message transmission period.

In step 414, the controller 304 in the CPE 300 may determine whether a predefined time has elapsed, depending on a specific signal that the front panel 302 transmits upon counting a time corresponding to the time difference information set in the previous active state.

If it is determined in step 414 that the predefined time has elapsed, meaning that the power-on request was not made by the user, the CPE 300 may determine that the power-on request was made upon the advent of an inform request message transmission period. Therefore, if the predetermined time has elapsed in step 414, the CPE 300 transitions to an active state in step 416, and exchanges inform messages with the ACS 100 in step 418. That is, in step 418, the CPE 300 transmits an inform request message to the ACS 100 and receives an inform response message from the ACS 100 in response thereto. In step 416, as the controller 304 supplies power to each module, the CPE 300 transitions to an active state.

After exchanging inform messages in step 418, the CPE 300 determines in step 420 whether request information has been received from the ACS 100. The request from the ACS 100 may include an S/W upgrade request for the CPE 300, or a request to change specific information according to other service-related change information. If it is determined in step 420 that no request information has been received from the ACS 100, the CPE 300 receives a SetParameterValue from the ACS 100 in step 432, and updates an inform request message transmission period in step 434. The reason for updating an inform request message transmission period in step 434 is because after exchanging inform messages with the CPE 300, the ACS 100 may adjust the next inform request message transmission period using specific parameters, such as the SetParameterValue.

In contrast, if it is determined that request information has been received from the ACS 100 in step 420 and that the request is an upgrade request in step 422, the CPE 300 performs S/W upgrade as predefined by the manufacturer in step 426. If it is determined in step 428 that the S/W upgrade is completed, the CPE 300 transmits a success/fail in S/W upgrade to the ACS 100 using a TransferComplete message in step 430. The TransferComplete message is a message defined in the TR-069 standard, and its description is omitted for simplicity. A format of the TransferComplete message is disclosed in a TR-069 document entitled "TECHNICAL REPORT DSL Forum TR-069 CPE Wide Area Network (WAN) Management Protocol". In contrast, if it is determined in step 422 that the request information from the ACS 100 is not an upgrade request, the CPE 300 performs a normal operation in step 424, and then proceeds to step 432.

After transmitting the TransferComplete message in step 430, the CPE 300 receives a SetParameterValue in step 432, and updates the inform request message transmission period with the received SetParameterValue in step 434.

In step 436, the CPE 300 sets the inform request message transmission period updated in step 434. A process of setting the updated inform request message transmission period in step 436 is described below. In step 436, as the controller 304 in the CPE 300 sets the updated inform request message transmission period in the front panel 302, the front panel 302 counts the updated inform request message transmission period. In step 438, the CPE 300 stores its current state information as a power standby state.

After storing the current state information as a power standby state in step 438, the CPE 300 transitions back to the power standby state in step 440, since it has temporarily transitioned from a power standby state to an active state in steps 416 through 438, for inform message exchange and S/W upgrade.

In contrast, if it is determined in step 414 that a predefined time has not elapsed, meaning that the power-on request was made by the user, the CPE 300 transitions to an active state in step 442, like a CPE 300 in a normal active state, and then exchanges inform messages with the ACS 100 in step 444. In step 446, the CPE 300 updates the inform request message transmission period with the inform request message transmission period that the ACS 100 has set after exchanging inform messages in step 444, and then stores the current state information as an active state in step 448. In step 450, the CPE 300 performs an operation corresponding to the request from the user.

While exemplary embodiments of the present invention have been described only for the premise equipment using the TR-069 protocol, they may be applied to any CPEs as long as their operating states can transition from an active state to a standby state, and vice versa.

Figure 5:
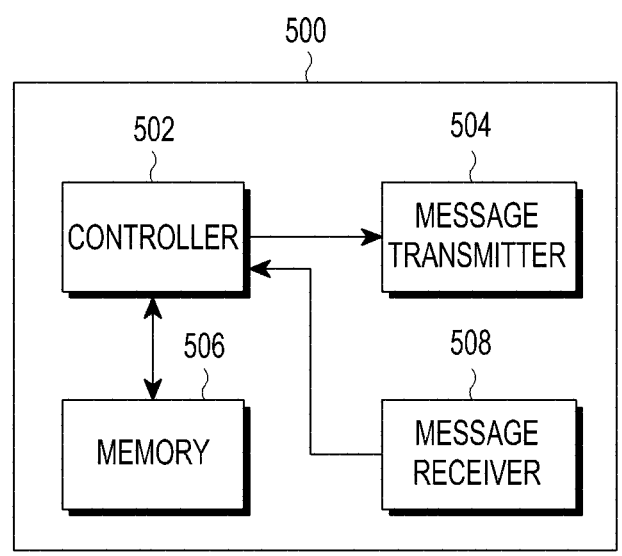
FIG. 5 is a block diagram of an ACS according to an exemplary embodiment of the present invention.

FIG. 5 is a block diagram of an ACS according to an exemplary embodiment of the present invention.

Referring to FIG. 5, a controller 502, controlling the overall operation of an ACS 500, exchanges inform messages with the CPE 300 through a message transmitter 504 and a message receiver 508. That is, upon receiving an inform request message from the CPE 300 through the message receiver 508, the controller 502 transmits an inform response message to the CPE 300 through the message transmitter 504 in response thereto. If state information of the CPE 300, included in the received inform request message, represents an active state, the controller 502 transmits no download message for S/W upgrade of the CPE 300. The reason is that the controller 502 may determine that the CPE 300 has transmitted an inform request message in an active state, and in this case, S/W upgrade for the CPE 300, though it is required, may lead to concentration of network traffics since the user is receiving a service.

On the other hand, if the CPE 300 is in a power standby state, the controller 502 may determine that the CPE 300 has woken up from the power standby state and transmit an inform request message. In this case, since the CPE 300 is providing no service to the user and the network traffics are not concentrated, the controller 502 may smoothly perform the S/W upgrade procedure. Therefore, the controller 502 determines whether S/W upgrade for the CPE 300 is required, based on software version information of the CPE 300, included in the inform request message received from the CPE 300.

If S/W upgrade for the CPE 300 is required, the controller 502 transmits a download message to the CPE 300 through the message transmitter 504. Upon receiving a TransferComplete message from the CPE 300 through the message receiver 508, the controller 502 informs the CPE 300 of the updated inform request message transmission period using a SetParameterValue.

The message transmitter 504 and the message receiver 508 exchange inform request/response messages with the CPE 300 using an HTTP or an HTTPS which is a security-enhanced HTTP, and the message transmitter 504 transmits a download message.

A memory 506 stores (i) information, such as the overall parameters required for an operation of the ACS 500, (ii) various information, such as an S/W version of the CPE 300, received using the inform request message, and (iii) state information of the CPE 300. Moreover, the memory 506 stores information required by the controller 503 to remotely control the CPE 300.

Figure 6:
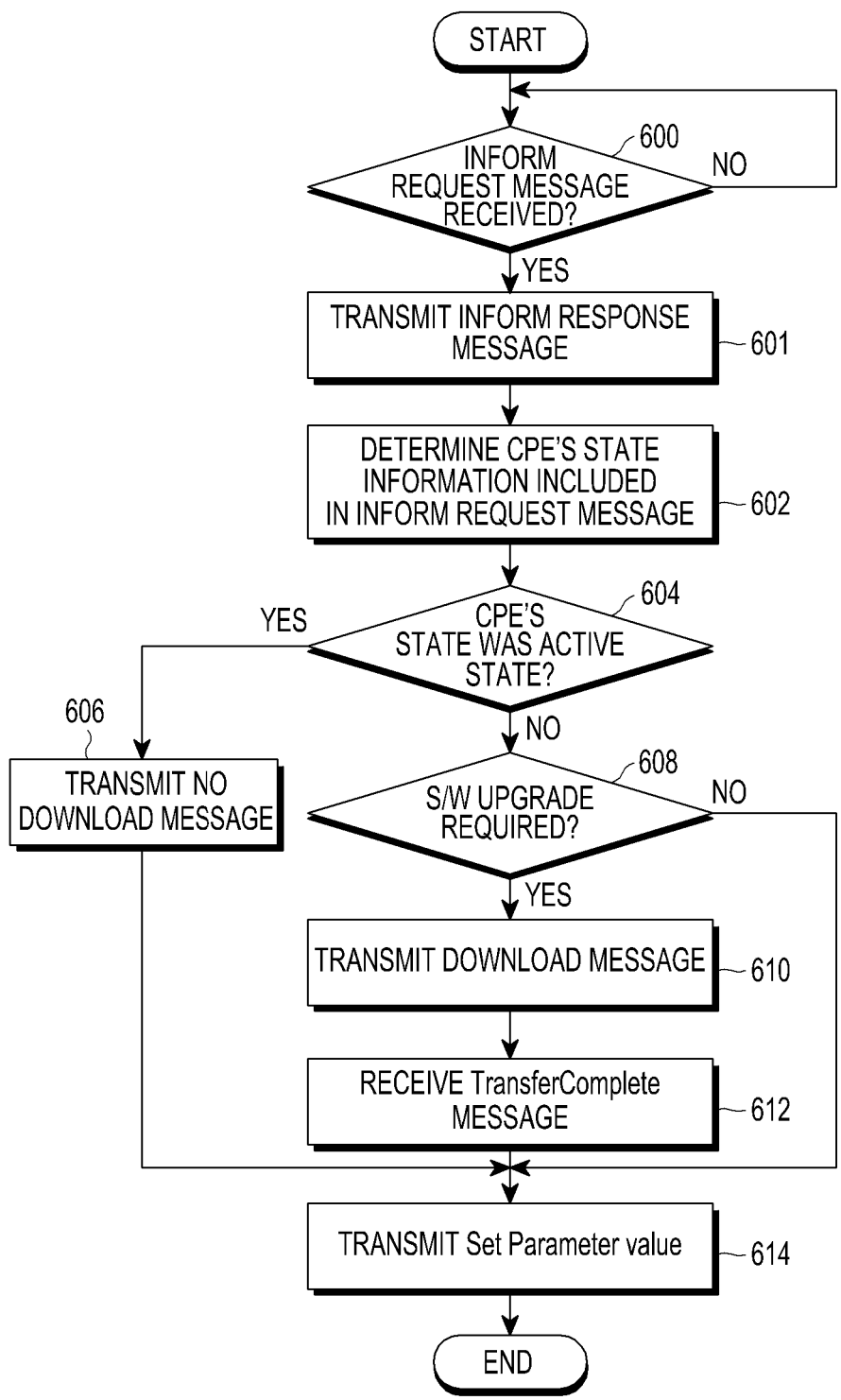
FIG. 6 is a flowchart illustrating an operation of an ACS according to an exemplary embodiment of the present invention.

FIG. 6 is a flowchart illustrating an operation of an ACS according to an exemplary embodiment of the present invention.

Referring to FIG. 6, an ACS 500 determines if an inform request message has been received from the CPE 300 in step 600. If it is determined in step 600 that an inform request message has been received from the CPE 300, the ACS 500 transmits an inform response message to the CPE 300 in response thereto in step 601. In step 602, the ACS 500 determines state information of the CPE 300, included in the received inform request message. If it is determined in step 604 that the state information of the CPE 300 represents an active state, meaning that the CPE 300 has transmitted the inform request message in an active state, the ACS 500 transmits no download message in step 606, and then transmits SetParameterValue to the CPE 300 to inform the updated inform request message transmission period in step 614.

In contrast, if it is determined in step 604 that the state information of the CPE 300 does not represent the active state, meaning that the CPE 300 has woken up from the power standby state and transitioned to an active state to transmit an inform request message, the ACS 500 determines in step 608 if a S/W upgrade for the CPE 300 is required. If it is determined in step 608 that a S/W upgrade for the CPE 300 is required, the ACS 500 transmits a download message to the CPE 300 in step 610.

Upon receiving a TransferComplete message with information indicating a success/fail in S/W upgrade from the CPE 300 in step 612, the ACS 500 informs the CPE 300 of the updated inform request message transmission period by transmitting a SetParameterValue to the CPE 300 in step 614. The TransferComplete message is information representing a success/fail in S/W upgrade for the CPE 300, and the ACS 500 transmits the SetParameterValue to the CPE 300 regardless of the success/fail in S/W upgrade for the CPE 300.

A signaling flow between an ACS 500 and a CPE 300, according to an exemplary embodiment of the present invention, will be described below with reference to FIG. 7.

Figure 7:
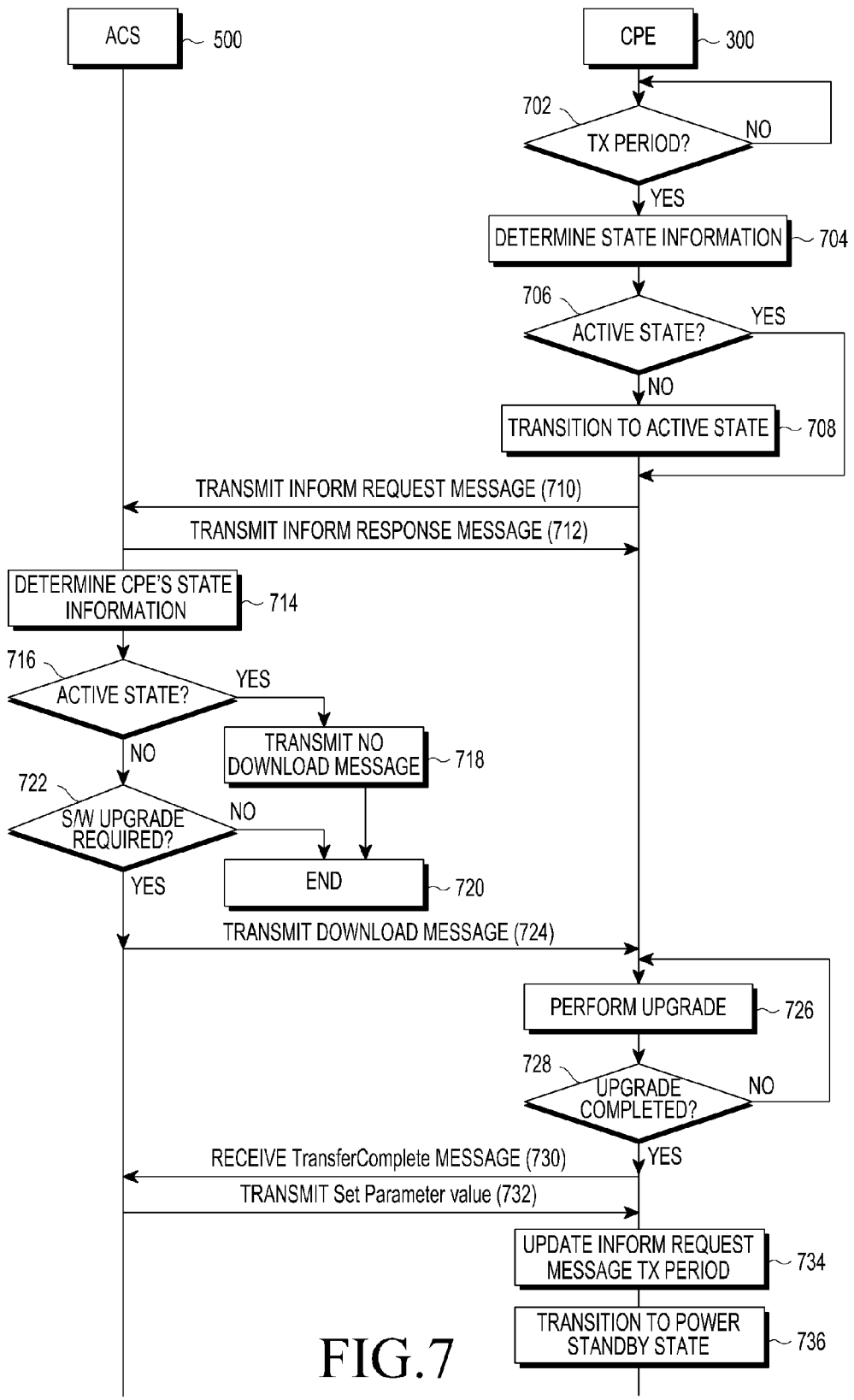
FIG. 7 is a diagram illustrating a signaling flow between an ACS and a CPE to upgrade the CPE according to an exemplary embodiment of the present invention.

FIG. 7 is a diagram illustrating a signaling flow between an ACS and a CPE to upgrade the CPE according to an exemplary embodiment of the present invention.

Referring to FIG. 7, a CPE 300 determines if an inform request message transmission period has expired in step 702. The inform request message transmission period is set for the CPE 300 by the ACS 500. The ACS 500 sets a new inform request message transmission period for the CPE 300, when service providers determine the need to change the inform request message transmission period, or when the ACS 500 exchanges inform messages as the CPE 300 reboots or the inform request message transmission period has expired. In FIG. 7, the new inform request message transmission period is set by a SetParameterValue transmitted in step 732.

If it is determined in step 702 that the inform request message transmission period has been received, the CPE 300 determines its state information in step 704. The 'state information' refers to information about a state of the CPE 300 at the advent of the inform request message transmission period, and becomes information indicating whether a state of the CPE 300 at the advent of the inform request message transmission period was an active state or a power standby state.

For example, if the state of the CPE 300 at the advent of the inform request message transmission period was an active state, the state information would be set as an active state, and if the state of the CPE 300 at the advent of the information request message transmission period was a power standby state, the state information would be se as a power standby state.

The reason why the CPE 300 determines the state information in step 704 is to determine whether the CPE 300 has transitioned from a power standby state to an active state to transmit an inform request message due to the advent of an inform request message transmission period, or the CPE 300 has continuously operated in an active state. In accordance with an exemplary embodiment of the present invention, if a state of the CPE 300 was an active state, the CPE 300 was providing a specific service to the user. In this case, therefore, even though S/W upgrade for the CPE 300 is required, it is preferable for the ACS 500 not to transmit a download message for upgrade, to the CPE 300.

On the other hand, if the CPE 300 transitions from a power standby state to an active state to transmit an inform request message, the state information will be a power standby state. In this case, since the CPE 300 is providing no service, an S/W upgrade procedure may be performed depending on whether S/W upgrade for the CPE 300 is required.

After determining state information in step 704, if it is determined in step 706 that state information of the CPE 300 does not represent an active state, the CPE 300 transitions to an active state in step 708, and transmits an inform request message according to the inform request message transmission period in step 710. The inform request message includes the state information determined in step 704. An example of including the state information in an inform request message according to an exemplary embodiment of the present invention will be described with reference to FIG. 8.

In contrast, if it is determined in step 706 that the state information of the CPE 300 represents an active state, the CPE 300 directly transmits an inform request message to the ACS 500 in step 710.

Upon receiving the inform request message from the CPE 300 in step 710, the ACS 500 transmits an inform response message to the CPE 300 in response thereto in step 712. In step 714, the ACS 500 determines state information of the CPE 300 by detecting state information included in the inform request message.

If it is determined in step 716 that the state information of the CPE 300 represents an active state, the ACS 500 does not transmit a download message for S/W upgrade of the CPE 300 in step 718, and ends the operation in step 720. The reason is that the ACS 500 may determine that the CPE 300 transmitted the inform request message in an active state, and in this case, since the user is receiving a service, S/W upgrade for the CPE 300, though it is required, may lead to concentration of network traffics. Thus, it is preferable for the ACS 500 not to transmit a download message.

In contrast, if it is determined in step 716 that the state information of the CPE 300 represents a power standby state, the ACS 500 determines in step 722 whether S/W upgrade for the CPE 300 is required. In step 722, the ACS 500 may determine whether S/W upgrade for the CPE 300 is required, depending on software version information of the CPE 300, included in the inform request message transmitted by the CPE 300. For example, if software version information of the ACS 500 is different from software version information of the CPE 300, the ACS 500 may request the CPE 300 to upgrade software.

If it is determined in step 722 that S/W upgrade for the CPE 300 is required, the ACS 500 transmits a download message to the CPE 300 in step 724. In contrast, it is determined in step 722 that if S/W upgrade is not required, the ACS 500 ends the operation in step 720. In step 722, the ACS 500 may determine that the CPE 300 has woken up from the power standby state and transmitted an inform request message, and if S/W upgrade for the CPE 300 is required, meaning that the user of the CPE 300 is receiving no service, the ACS 500 transmits a download message to the CPE 300 in step 724.

Upon receiving the download message in step 724, the CPE 300 performs upgrade according to the procedure predefined by the manufacturer in step 726. If it is determined in step 728 that the upgrade has completed, the CPE 300 transmits a TransferComplete message to the ACS 500 in step 730. In step 732, the ACS 500 transmits a SetParameterValue to the CPE 300 to inform the CPE 300 of an updated inform request message transmission period.

Upon receiving the SetParameterValue, the CPE 300 updates an inform request message transmission period with a value defined in the SetParameterValue in step 734, and transitions back to the power standby state in step 736, knowing that the CPE 300 itself has transitioned from the power standby state to the active state to transmit the inform request message.

FIG. 8 illustrates a format of an inform request message with state information according to an exemplary embodiment of the present invention.

Referring to FIG. 8, reference can be made to "TECHNICAL REPORT DSL Forum TR-069 CPE WAN Management Protocol" for elements 802, 804, 806, 808, 810, and 812.

In addition to the elements 802 to 812, state information 'StateInfo' 814 is added in an inform request message 800, as illustrated in FIG. 8. The CPE 300 sets and transmits the state information 814 depending on the state of the CPE 300.

While exemplary embodiments of the present invention have been described only for the premise equipment using the TR-069 protocol, the present invention may be applied to any CPEs as long as their operating states can transition from an active state to a standby state, and vice versa.

It would be apparent to those of ordinary skill in the art that the above-described method of exemplary embodiments of the present invention may be embodied in a program and stored in a computer readable recording medium (e.g., including any or all of a CD-ROM, a RAM, a floppy disk, a hard disk, a magneto-optical disk, a flash memory, and the like).

As is apparent from the foregoing description, an ACS and a CPE can stably exchange inform messages, no matter whether the CPE is in a power standby state, by which both the service provider and the CPE user may conveniently manage the CPE.

In addition, an ACS can effectively perform an upgrade procedure for a CPE even though the CPE is in a power standby state of a CPE, in which a user does not use the CPE, contributing to distributing network traffics.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A communication method in a Customer Premise Equipment (CPE), the communication method comprising:
determining, at the CPE, in a power standby state whether an inform request message transmission period has arrived;
if the inform request message transmission period has arrived, transitioning from the power standby state to an active state and transmitting an inform request message to an Automatic Configuration Server (ACS);
receiving an inform response message from the ACS in response to the inform request message; and
upon receiving the inform response message, transitioning from the active state to the power standby state.

2. The communication method of claim 1, wherein the inform request message transmission period is updated when the CPE transitions from the active state to the power standby state.

3. The communication method of claim 2, wherein the inform request message transmission period is updated by a value provided from the ACS after the CPE receives the inform response message.

4. The communication method of claim 1, wherein if a state of the CPE in the inform request message transmission period is the power standby state, the inform request message includes state information indicating that a state of the CPE is the power standby state, and if a state of the CPE in the inform request message transmission period is the active state, the inform request message includes state information indicating that a state of the CPE is the active state.

5. The communication method of claim 4, further comprising,
if a software upgrade request is received from the ACS after receiving the inform response message, performing a software upgrade procedure predefined by a manufacture of the CPE.

6. The communication method of claim 5, wherein the software upgrade request is transmitted by the ACS in response to an inform request message including state information indicating the power standby state.

7. The communication method of claim 4, wherein the inform request message further includes version information of an operating program installed in the CPE.

8. The communication method of claim 1, further comprising,
if transition to the active state is requested by a user before the advent of the inform request message transmission period in the power standby state, transitioning from the power standby state to the active state, exchanging inform messages with the ACS, and maintaining the active state.

9. The communication method of claim 1, wherein the arrival of the inform request message transmission period is determined by a front panel to which operating power is supplied evenly in the power standby state.

10. A communication apparatus for performing communication with an Automatic Configuration Server (ACS), the communication apparatus comprising:
a front panel for determining in a power standby state whether an inform request message transmission period has arrived, and for generating a wake-up signal if the inform request message transmission period has arrived; and
a communication controller for transitioning from the power standby state to an active state if the wake-up signal is generated by the front panel, for transmitting an inform request message to the ACS, receiving an inform response message from the ACS in response to the inform request message, and for switching the communication apparatus from the active state to the power standby state upon receiving the inform response message.

11. The communication apparatus of claim 10, wherein the inform request message transmission period is updated during transition from the active state to the power standby state.

12. The communication apparatus of claim 11, wherein the inform request message transmission period is updated by a value provided from the ACS after reception of the inform response message.

13. The communication apparatus of claim 10, wherein if a state of the communication apparatus in the inform request message transmission period is the power standby state, the inform request message includes state information indicating that a state of the communication apparatus is the power standby state, and if a state of the communication apparatus in the inform request message transmission period is the active state, the inform request message includes state information indicating that a state of the communication apparatus is the active state.

14. The communication apparatus of claim 13, wherein if a software upgrade request is received from the ACS after receiving the inform response message, the communication module performs a software upgrade procedure predefined by a manufacturer of the communication apparatus.

15. The communication apparatus of claim 14, wherein the software upgrade request is transmitted from the ACS in response to the inform request message including state information indicating the power standby state.

16. The communication apparatus of claim 13, wherein the inform request message further includes version information of an operating program installed in the communication apparatus.

17. The communication apparatus of claim 10, wherein if transition to the active state is requested by a user before the advent of the inform request message transmission period in the power standby state, the communication controller transitions from the power standby state to the active state, exchanges inform messages with the ACS, and then maintains the communication apparatus in the active state.

18. A communication method in an Automatic Configuration Server (ACS) performing communication with a Customer Premise Equipment (CPE), the communication method comprising:
receiving an inform request message from the CPE which determines whether the inform request message transmission period has arrived and transitions from a power standby state to an active state;
transmitting an inform response message to the CPE in response to the inform request message;
determining state information of the CPE included in the inform request message; and
transmitting no download message to the CPE if the state information represents the active state, and transmitting a download message to the CPE if the state information represents the power standby state,
wherein the state information of the CPE indicates a state of the CPE when the inform request message transmission period has arrived.

19. The communication method of claim 18, further comprising:
determining whether CPE software upgrade is required, based on version information of software installed in the CPE, which is included in the inform request message.

20. The communication method of claim 18, further comprising:
after transmitting the inform response message, updating the inform request message transmission period in which the inform request message is to be transmitted, and
transmitting information about the updated inform request message transmission period to the CPE.

21. An Automatic Configuration Server (ACS) apparatus comprising:
a message receiver for receiving an inform request message from a Customer Premise Equipment (CPE) which determines whether the inform request message transmission period has arrived and transitions from a power standby state to an active state;
a controller for determining state information of the CPE, included in the received inform request message, and for instructing the ACS to transmit a download message if the state information represents the power standby state; and
a message transmitter for transmitting the download message and an inform response message as a response to the inform request message, to the CPE under control of the controller, wherein the state information of the CPE indicates a state of the CPE when the inform request message transmission period has arrived.

22. The ACS apparatus of claim 21, wherein the controller determines whether CPE software upgrade is required, based on version information of software installed in the CPE, which is included in the inform request message.

23. The ACS apparatus of claim 21, wherein after transmitting the inform response message, the controller updates the inform request message transmission period in which the inform request message is to be transmitted, and transmits information about the updated inform request message transmission period to the CPE through the message transmitter.

* * * * *